US012607719B2

(12) United States Patent (10) Patent No.: US 12,607,719 B2
Scheiber et al. (45) Date of Patent: Apr. 21, 2026

(54) METHOD FOR DETECTING AT LEAST ONE OBJECT IN SURROUNDINGS BY MEANS OF REFLECTION SIGNALS OF A RADAR SENSOR SYSTEM

(71) Applicant: Robert Bosch GmbH, Stuttgart (DE)

(72) Inventors: Ernest-Adrian Scheiber, Budapest (HU); Alan Koncar, Endeavour Hills (AU); Claudius Glaeser, Ditzingen (DE); Florian Faion, Staufen (DE); Chun Yang, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 18/257,212

(22) PCT Filed: Dec. 16, 2021

(86) PCT No.: PCT/EP2021/086060
§ 371 (c)(1),
(2) Date: Nov. 9, 2023

(87) PCT Pub. No.: WO2022/129266
PCT Pub. Date: Jun. 23, 2022

(65) Prior Publication Data
US 2025/0341610 A1 Nov. 6, 2025

(30) Foreign Application Priority Data
Dec. 17, 2020 (DE) .................... 10 2020 216 196.8

(51) Int. Cl.
*G01S 7/41* (2006.01)
*G01S 13/42* (2006.01)
(Continued)

(52) U.S. Cl.
CPC ............... *G01S 7/417* (2013.01); *G01S 7/411* (2013.01); *G01S 13/42* (2013.01); *G01S 13/89* (2013.01); *G01S 13/931* (2013.01)

(58) Field of Classification Search
CPC .......... G01S 7/417; G01S 7/411; G01S 13/42; G01S 13/89; G01S 13/931
See application file for complete search history.

(56) References Cited

U.S. PATENT DOCUMENTS 11,250,288 B2 * 2/2022 Sano .................... G05D 1/0253
11,879,992 B2 * 1/2024 Lang .................... G01S 13/723
(Continued)

OTHER PUBLICATIONS

International Search Report corresponding to PCT Application No. PCT/EP2021/086060, mailed Apr. 19, 2022 (German and English language document) (5 pages).
(Continued)

*Primary Examiner* — Peter M Bythrow
(74) *Attorney, Agent, or Firm* — Maginot, Moore & Beck LLP

(57) ABSTRACT

A method for detecting an object includes providing respective spatial coordinates relating to a multiplicity of reflection signals of a frame of a radar sensor system and providing a measurement attribute of a first portion of the multiplicity of reflection signals. The respective spatial coordinates of the multiplicity of reflection signals are transformed into an occupancy grid. An occupancy grid is generated with the multiplicity of reflection signals being spatially represented in the occupancy grid by mapping the respective spatial coordinates of the multiplicity of reflection signals in the occupancy grid and assigning the respective first measurement attribute of the multiplicity of reflection signals to the spatial representation of the multiplicity of reflection signals. An input tensor is generated using the occupancy grid
(Continued)

for a trained neural network for detecting the at least one object. The object is detected using the input tensor and the trained neural network.

15 Claims, 3 Drawing Sheets

(51) Int. Cl.
  *G01S 13/89*　　　　(2006.01)
  *G01S 13/931*　　　(2020.01)

(56) References Cited

U.S. PATENT DOCUMENTS

| | | | | |
|---|---|---|---|---|
| 11,960,290 | B2* | 4/2024 | Laddha | G01S 13/60 |
| 2014/0035775 | A1* | 2/2014 | Zeng | G06F 18/253 |
| | | | | 342/52 |
| 2017/0116487 | A1* | 4/2017 | Yamazaki | G05D 1/0251 |
| 2017/0269201 | A1* | 9/2017 | Adachi | G01S 13/931 |
| 2019/0050653 | A1* | 2/2019 | Natroshvili | G06T 7/521 |
| 2019/0346854 | A1* | 11/2019 | Slutsky | G01S 13/878 |
| 2020/0175315 | A1* | 6/2020 | Gowaikar | G01S 13/89 |
| 2020/0217950 | A1* | 7/2020 | Unnikrishnan | G01S 17/931 |
| 2020/0218913 | A1* | 7/2020 | Unnikrishnan | G01S 13/867 |
| 2021/0018615 | A1* | 1/2021 | Su | G01S 13/726 |
| 2021/0156960 | A1* | 5/2021 | Popov | G01S 13/5242 |
| 2021/0156963 | A1* | 5/2021 | Popov | G06N 3/0464 |
| 2021/0165093 | A1* | 6/2021 | Komorkiewicz | G06T 7/11 |
| 2021/0293927 | A1* | 9/2021 | Tyagi | G01S 7/412 |
| 2021/0389769 | A1* | 12/2021 | Hari | G05B 13/027 |
| 2022/0153262 | A1* | 5/2022 | Gallo | G01S 7/417 |
| 2022/0161824 | A1* | 5/2022 | Refaat | B60W 60/00272 |

OTHER PUBLICATIONS

Major et al., "Vehicle Detection With Automotive Radar Using Deep Learning on Range-Azimuth-Doppler-Tensors", 2019 IEEE/CVF International Conference on Computer Vision Workshop (ICCVW), IEEE, Oct. 27, 2019 (Oct. 27, 2019), pp. 924-932.

* cited by examiner

METHOD FOR DETECTING AT LEAST ONE OBJECT IN SURROUNDINGS BY MEANS OF REFLECTION SIGNALS OF A RADAR SENSOR SYSTEM

This application is a 35 U.S.C. § 371 National Stage Application of PCT/EP2021/086060, filed on Dec. 16, 2021, which claims the benefit of priority to Serial No. DE 10 2020 216 196.8, filed on Dec. 17, 2020 in Germany, the disclosures of which are incorporated herein by reference in their entirety.

Method for detecting at least one object in surroundings by means of reflection signals of a radar sensor system

BACKGROUND

Automated driving must ensure a good perception of the environment. Radar sensor systems are important for perceiving the environment due to their precise measurements of distance and speed. Radar sensor systems are inexpensive and robust in relation to different light and weather conditions.

Conventional radar object detection is achieved by a CFAR (Constant False Alarm Rate) detector which generates a series of isolated radar reflections with measurements of range, azimuth angle, elevation angle, speed (Doppler), and RCS (intensity).

SUMMARY

Proposed according to aspects of the disclosure are a method for detecting at least one object in surroundings by means of reflection signals of a radar sensor system, a method for training a neural network for detecting at least one object by means of reflection signals of a radar sensor system, a detection device, a computer program, and a machine-readable storage medium according to the features of the independent claims. Advantageous embodiments are the subject matter of the dependent claims and the description hereinafter.

Throughout this description of the disclosure, the sequence of method steps is presented so that the method is easy to follow. However, the skilled person will recognize that many of the method steps can also be performed in a different order and lead to the same or a corresponding result. In this respect, the order of the method steps can be changed accordingly. Some features are numbered in order to improve readability or to make the associations more clear, but this does not imply a presence of specific features.

According to one aspect, a method for detecting at least one object in surroundings by means of reflection signals of a radar sensor system is proposed, comprising the following steps:

In one step, respective spatial coordinates relating to a multiplicity of the reflection signals of at least one frame of the radar sensor system are provided. In a further step, a respective first measurement attribute of at least a first portion of the multiplicity of reflection signals of at least one frame of the radar sensor system is provided. In a further step, the respective spatial coordinates of the multiplicity of reflection signals of the at least one frame are transformed into an occupancy grid. In a further step, an occupancy grid is generated, wherein the multiplicity of reflection signals of the at least one frame is spatially represented in the occupancy grid by mapping the respective spatial coordinates of the multiplicity of reflection signals of the at least one frame in the occupancy grid and assigning the respective first measurement attribute of the multiplicity of reflection signals of the at least one frame to the spatial representation of the multiplicity of reflection signals of the at least one frame. In a further step, an input tensor is generated by means of the occupancy grid that spatially represents the multiplicity of reflection signals of the at least one frame and the respective assigned first measurement attribute for a trained neural network for detecting the at least one object. And, in a further step, the at least one object is detected by means of the input tensor and the trained neural network.

In neural networks, the signal at a connection of artificial neurons can be a real number, and the output of an artificial neuron is calculated by a non-linear function of the sum of its inputs. The connections of the artificial neurons typically feature a weighting that adjusts as learning progresses. The weighting increases or reduces the strength of the signal at a connection. Artificial neurons can have a threshold such that a signal is output only when the total signal exceeds that threshold.

A multiplicity of artificial neurons is typically grouped in layers. Different layers can perform different types of transformations for their inputs. Signals travel from the first layer, the input layer, to the last layer, the output layer; possibly after traversing the layers multiple times.

The architecture of such an artificial neural network can be a neural network that may be expanded with further, differently structured layers. Such neural networks basically include at least three layers of neurons: an input layer, an intermediate layer (hidden layer), and an output layer. In other words, all of the neurons of the network are divided into layers.

In feed-forward networks in the present context, no connections to previous layers are implemented. With the exception of the input layer, the different layers consist of neurons that are subject to a nonlinear activation function and can be connected to the neurons of the next layer. A deep neural network can comprise many such intermediate layers.

Such neural networks have to be trained for their specific task. Each neuron of the corresponding architecture of the neural network in this case receives, e.g., a random initial weighting. The input data is then entered into the network and each neuron can weight the input signals given their weighting and forward the result to the neurons in the next layer. The overall result is then provided at the output layer. The magnitude of the error can be calculated, as well as the contribution each neuron made to that error, in order to then change the weighting of each neuron in the direction that minimizes the error. This is followed by recursive runs, renewed measurements of the error and adjustment of the weighting until an error criterion is met.

Such an error criterion can be the classification error on a test data set or also a current value of a loss function, for example on a training data set. Alternatively or additionally, the error criterion can relate to a termination criterion as a step in which an overfitting would begin during training or the available time for training has expired.

The method for detection can utilize a radar standard output as the input for processing and thus does not require a particularly demanding data transmission rate for the radar sensor system. Furthermore, the method does not require preprocessing and feature extraction for the data processing.

The respective reflection signal can be described spatially by polar coordinates having a reflection distance, an azimuth angle r, an elevation angle, a speed assigned to the reflection angle, and an assigned reflection strength (RCS: radar cross-section). To this end, the reflection signal can be determined from the reflection signal determined with the radar sensor system, taking into account a particular first-person motion of the radar sensor system.

The detected object can be represented with a two-dimensional or three-dimensional bounding box, which indicates the position and orientation of the vehicle relative to the coordinates of the radar sensor system and the extension of the object in two and/or three directions.

The reflection signals can be rendered into the occupancy grid, wherein each pixel of the occupancy grid is occupied with either 1 or 0 in order to represent whether or not a radar reflection described by the reflection signal is included. The assigned measurement attributes, such as speed and/or radar signal strength (RCS), can be assigned to the occupancy grid or data format of the occupancy grid, for example in the form of additional planes, and can have a different range of values than the occupancy grid. In order to achieve a data structure corresponding to the occupancy grid, the assigned measurement attributes can be normalized.

Thus, the method proposed herein uses the entire radar data of at least one frame as the input for an object detection, a classification, and a bounding box regression of the object. Advantageously, the method can detect a multiplicity of objects simultaneously, provided they are captured in the respective frames. As a result, a continuous, single-step, and proposal-free detector for processing radar data can be provided.

The following two preprocessing steps are therefore avoided: grouping radar targets in clusters and generating predefined feature vectors from these clusters prior to the actual detection. This method, which eliminates these preprocessing steps, can significantly increase the performance of the detection.

In addition, such a one-stage detector has a higher computational efficiency without performance losses compared to a two-stage detector, such as a region proposal network (PRN), which can be particularly important for sparse radar reflections, and is thus suitable for a real-time implementation.

According to one aspect, it is proposed that the occupancy grid comprises Cartesian coordinates and/or is arranged around the radar sensor system. Such a description is particularly favorable and can be arranged in relation to a first-person vehicle with a radar sensor system such that the origin of the occupancy grid lies in the radar sensor system.

According to one aspect, it is proposed that the respective spatial coordinates of a multiplicity of reflection signals of the at least one frame of the radar sensor system of radar reflection data be provided in polar coordinates. Advantageously, the reflection signals from the radar sensor systems are provided in polar coordinates.

It is proposed according to one aspect that the method comprise the following steps:

providing respective second measurement attributes respectively determined by means of at least a second portion of the multiplicity of reflection signals of the at least one frame; and generating the input tensor by additionally assigning the respective second measurement attribute of the at least first portion of the multiplicity of reflection signals of the at least one frame to the multiplicity of reflection signals in the occupancy grid.

By extending the input tensor by the second measurement attribute, which can in particular indicate a speed of the object point represented with the reflection signal, the accuracy of the detection and the safety of the detection of the object can be increased.

According to one aspect, it is proposed that the input tensor be generated by designing the occupancy grid in a two-dimensional manner and transforming the respective spatial coordinates of the multiplicity of reflection signals of the at least one frame into the two-dimensional occupancy grid. Depending on the accuracy of the radar sensor system used, it may be favorable to design the occupancy grid two-dimensionally in order to not generate additional inaccuracy for the detection of the object with inaccurate elevation information, which can, e.g., be indicated by an elevation angle from the radar sensor system.

By means of the elevation angle, a reflection height can be determined according to the determination or transformation of the polar coordinates with the azimuth angle. When a height of the respective reflection is not taken into account, this means that all reflections apparently return from the same plane at a certain height above the ground.

By means of a two-dimensional occupancy grid, a representation of the reflection signals can be realized from a bird's eye view (BEV). A data structure of such a two-dimensional occupancy grid can use an occupancy with a reflection signal, a radar reflection strength (RCS), and a speed determined using the reflection signals in order to build up representation layers.

First, 3D dimensions L*W*H of the scene can be defined, then occupancy feature maps can be calculated at a grid resolution of dL*dW*dH, and an RCS and speed feature map can be calculated with a resolution of dL*dW*dH. When the occupancy feature maps have two additional channels in order to cover points out of range, the final representation can be in the form (L/dL)*(W/dW)*(H/dH+4).

According to one aspect, it is proposed that the input tensor be generated by spatially representing the multiplicity of reflection signals of a multiplicity of frames in the occupancy grid. In so doing, additional reflection signals can be received in the occupancy grid. Alternatively or additionally, when the reflection signal relates to a cell of the occupancy grid that already represents a reflection signal, statistical metrics, in particular a mean, can be described. The inclusion of reflection signals in the occupancy grid can also be made depending on a provided accuracy of the angular determination in polar coordinates. Given that the reflection signals of a typical road scene are sparse, a multiplicity of frames and the assigned additional reflection signals can improve an accuracy of the detection of the object.

Advantageously, by considering a multiplicity of frames, an impact of the sparsity of radar data can be reduced by accumulating reflection signals from a multiplicity of frames in the occupancy grid. In particular, when performing multi-class classification and regression, the density of the radar data has a significant impact on a detection performance of the neural network. Taking into account the resolution and measurement rate of a radar sensor system used, the vehicle construction, and the application target, an accumulation of reflection signals can an improve detection.

According to one aspect, it is proposed that the first measurement attribute of the reflection signal be different from the second measurement attribute of the reflection signal; and/or the respective measurement attribute comprises a speed and/or a radar cross-section and/or an elevation.

Additional measurement attributes can be represented in a view of the occupancy grid by adding an additional layer.

The strength of a reflection signal with a radar cross-section can be described in this respect.

A method is proposed for training a neural network for detecting at least one object by means of reflection signals of a radar sensor system according to the method described hereinabove in order to detect at least one object in surroundings by means of reflection signals of a radar sensor system, said method comprising the following steps:

In one step, respective spatial coordinates of a multiplicity of reflection signals of at least one frame of the radar sensor system are provided. In a further step, respective first measurement attributes of at least a first portion of the multiplicity of reflection signals of at least one frame of the radar sensor system are provided. In a further step, the respective spatial coordinates of the multiplicity of reflection signals of the at least one frame are transformed into an occupancy grid. In a further step, spatial coordinates are provided for the at least one object to be detected by means of the reflection signals of the radar sensor system. In a further step, an occupancy grid is generated, wherein the multiplicity of the reflection signals of the at least one frame is spatially represented in the occupancy grid by mapping the respective spatial coordinates of the multiplicity of the reflection signals of the at least one frame in the occupancy grid and assigning the respective first measurement attribute of the multiplicity of the reflection signals of the at least one frame to the spatial representation of the multiplicity of the reflection signals of the at least one frame. In a further step, an input tensor is generated by means of the occupancy grid that spatially represents the multiplicity of the reflection signals of the at least one frame and the respective assigned first measurement attributes for the neural network. In further steps, a multiplicity of input tensors generated in this manner is formed, each having a multiplicity of different reflection signals of at least one frame of the radar sensor system. In further steps, training the neural network is trained using the multiplicity of input tensors and respective assigned provided spatial coordinates of the at least one object to be detected for detecting at least one object in surroundings by means of signals of a radar sensor system.

As with the detection, the object can in this case be represented with a two-dimensional or three-dimensional bounding box.

The neural network is therefore trained to indicate both a location of the object and the extension and arrangement of the object in relation to the coordinates of the corresponding reflection signal. The proposed method therefore simultaneously performs an object detection as well as a regression of the object.

According to one aspect regarding said method for training, it is proposed that the method comprises the following steps:

In one step, respective second measurement attributes determined by means of at least a second portion of the multiplicity of reflection signals of the at least one frame are provided. In a further step, the input tensor is generated by additionally assigning the respective second measurement attribute of the at least first portion of the multiplicity of reflection signals of the at least one frame to the multiplicity of reflection signals in the occupancy grid.

According to one aspect, it is proposed for the training method that the input tensor be generated by designing the occupancy grid in a two-dimensional manner and transforming the respective spatial coordinates of the multiplicity of reflection signals of the at least one frame into the two-dimensional occupancy grid.

According to one aspect, it is proposed for the training method that the input tensor be generated by spatially representing the multiplicity of reflection signals of a multiplicity of frames in the occupancy grid.

Advantageously, the higher frequency of provision of data of a radar sensor system can ensure a sufficient temporal resolution of the detection of the object when a multiplicity of frames in the occupancy grid is spatially represented.

According to one aspect, it is proposed that the neural network comprises a backbone network and a head network. By subdividing the neural network into a backbone network, which in particular provides a feature map, and a head network, which provides the classification and parameterization of the object, the respective portion of the neural network can be trained particularly specifically for its task.

In other words, a structure of the method of detection can comprise four parts: a radar data preprocessing, a radar data representation, a backbone network, and a head network.

A standard output of a radar sensor system having a reflection distance, an azimuth angle, an elevation angle, and a speed and radar signal strength (RCS) assigned to the respective reflection signal can be used in the radar data preprocessing process.

In the preprocessing process, a transformation of the reflection signals of the polar coordinate system into the Cartesian system can be performed by the distance and azimuth angle according to the occupancy grid used. In an occupancy grid in Cartesian coordinates, the two-dimensional positions of the reflection signals can be determined from a respective radial distance r and an azimuth angle.

The backbone network can feature blocks of a neural convolutional network used in order to extract robust features from input data. To this end, the backbone can feature residual blocks. In fact, many trend networks in this backbone network can be used, e.g., vgg16 with half the channel count, pvanet, resnet-50, etc.

The head network can feature small convolutional filters that make task-specific predictions.

The head network can in this case feature a multiplicity of variants:

a. Two branches, each separately pursuing a task: one branch for classification and the other for bounding box regression (location).

In this case, the classification branch C outputs channels with confidence values, whereby each channel corresponds to the individual classes.

A special class or object class can in this case represent a background or a non-object that can be included in class categories. A regression branch P can output channels of predictions, wherein each channel corresponds to a regressed parameter.

b. Two branches share sub-layers. The output of each branch corresponds to the variant a.

c. An entire branch carries the multi-tasking output. The output of the head network includes (C+P) channels for C-classes and P-parameter predictions, i.e., the classification result that includes the detection, because the background is considered a special object class.

According to one aspect, it is proposed that the original neural network be a neural convolutional network.

A method is proposed in which, based on at least one detected object that has been detected according to one of the methods described hereinabove, an actuating signal for actuating an at least semi-automated vehicle is provided; and/or based on the at least one detected object, an alert signal for alerting and/or intervention is provided to a vehicle occupant.

The term "based on" is to be broadly understood with respect to the feature that an actuating signal is provided based on at least one detected object generated according to one of the methods described hereinabove. The latter term is understood to mean that the detected object is used for every determination or calculation of an actuating signal, whereby this does not exclude the possibility that other input variables are used for this determination of the control signal, as well. The same applies correspondingly to the provision of an alert signal or emergency signal.

A detection device is proposed which is configured to perform one of the methods described hereinabove. Using such a detection device, the method in question can easily be integrated into various systems.

According to one aspect, a computer program is specified, which comprises commands that, when the computer program is executed by a computer, cause the computer to perform one of the methods described hereinabove. Such a computer program enables the described method to be used in various systems.

A machine-readable memory medium is specified, on which the computer program described hereinabove is stored. Such a machine-readable memory medium makes the computer program described hereinabove portable.

BRIEF DESCRIPTION OF THE DRAWINGS

Exemplary embodiments of the disclosure are described with reference to FIGS. 1 to 4 and will be explained in greater detail hereinafter. Shown are:

FIG. 4a a lidar detection signal of a road situation; and

FIG. 4b a radar detection signal of the road situation of FIG. 4a.

DETAILED DESCRIPTION

Figure 1:
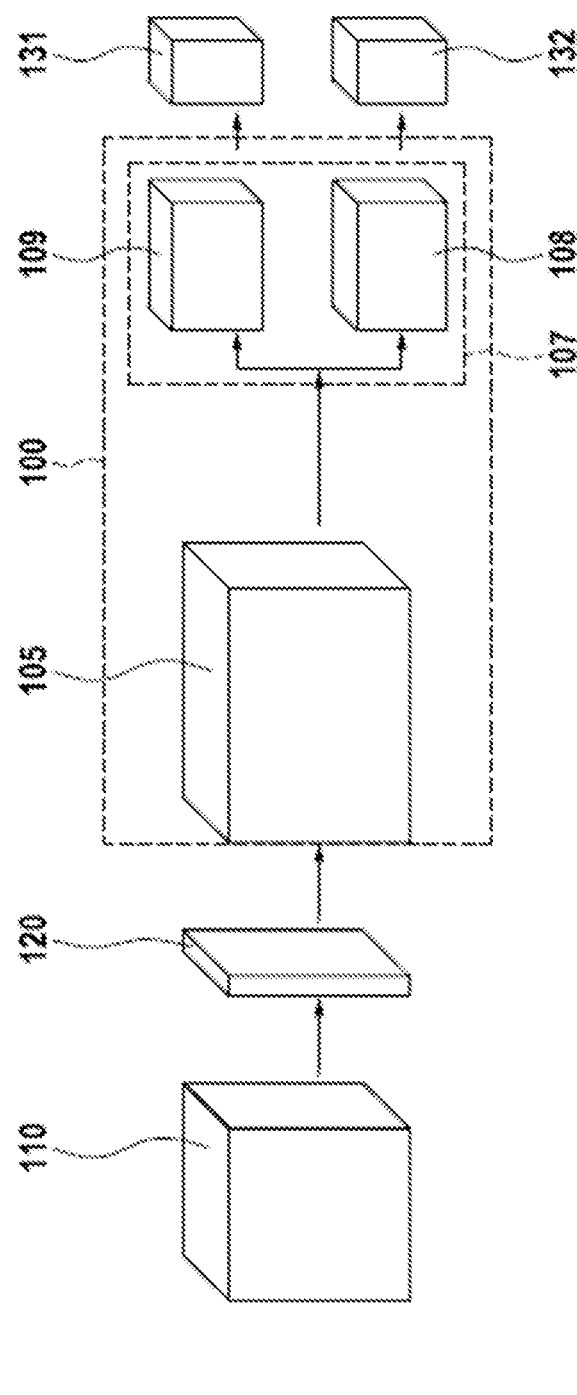
FIG. 1 a data flow diagram of the method for detecting at least one object by means of reflection signals.

FIG. 1 schematically outlines a data flow diagram of the method for detecting at least one object by means of reflection signals of a radar sensor system. A point cloud 110 of reflection signals is provided with their spatial coordinates and a respective first measurement attribute of the at least one first portion of the multiplicity of reflection signals of at least one frame of the radar sensor system. The respective spatial coordinates of the multiplicity of reflection signals of the at least one frame are transformed into an occupancy grid 120, and an occupancy grid is generated, whereby the multiplicity of reflection signals of the at least one frame is spatially represented in the occupancy grid by arranging the respective spatial coordinates of the multiplicity of reflection signals of the at least one frame in the occupancy grid and assigning the respective first measurement attribute of the multiplicity of reflection signals of the at least one frame to the spatial representation of the multiplicity of reflection signals of the at least one frame. An input tensor is generated by means of the occupancy grid, wherein the occupancy grid spatially represents the multiplicity of reflection signals of the at least one frame, and the respective first measurement attribute for a trained neural network 105, 107 is assigned in order to detect the at least one object by means of signals of a radar sensor system. The at least one object is detected by means of the input tensor and the trained neural network 105, 107 by classifying 131 it with a first head network 109 and parameterizing it with a second head network 108.

Figure 2:
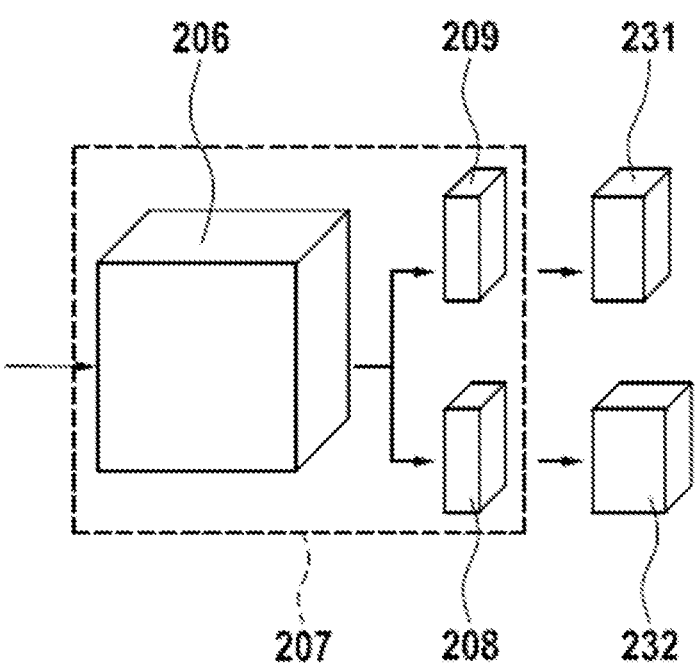
FIG. 2 a modification of the head network of FIG. 1.

FIG. 2 outlines a variant of the head network 207, which is divided into three main parts 206, 208, 209, wherein a common head part 206 cooperates with a first head part 209 and a second head part 208 in order to classify 231 and parametrize 232 the object.

Figure 3:
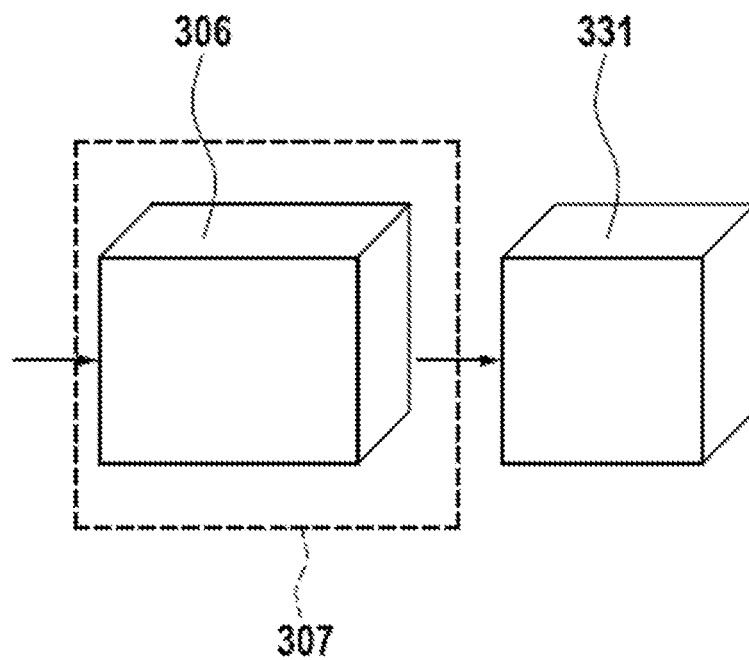
FIG. 3 a further modification of the head network of FIG. 1.

FIG. 3 outlines a further variant of the head network 307, which comprises only a single head part and provides both the classification and the parameterization 331.

Figure 4:
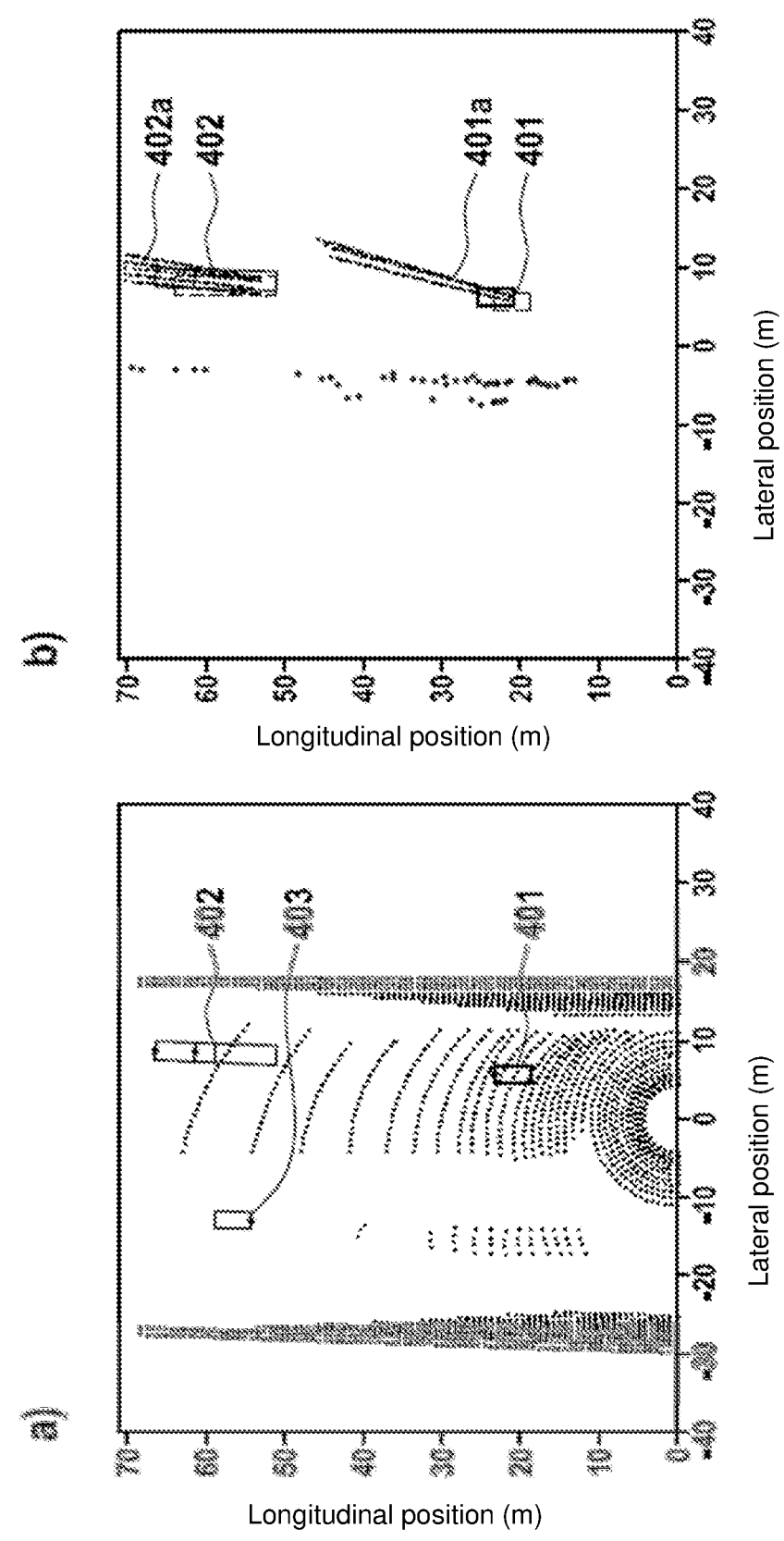

FIG. 4a outlines results of the method with real-time recorded radar data in a road situation detected by means of a LIDAR sensor system and representing a vehicle 401 following a truck 402. A further vehicle 403 approaches the two vehicles.

FIG. 4b outlines the same road situation as in FIG. 4a, but detected by means of a radar system. The speeds are thereby assigned to the respective detected object and designated as speed vectors 401a for the vehicle 401 and designated as speed vectors 402a for the truck 402. The boxes with solid lines correspond to ground truth data, and boxes with dotted lines correspond to detections of the network. In the lateral and longitudinal position 0.0, FIG. 4a and FIG. 4b both show the view from a first-person vehicle, from which the speeds of the vehicles 401, 402 are estimated and oriented radially according to the measurement method. The vehicle 403 traveling in the opposite direction cannot be detected by the radar sensor system because no corresponding reflection signal is received.

The invention claimed is:

1. A method for detecting at least one object in surroundings using reflection signals of a radar sensor system, comprising:

providing respective spatial coordinates relating to a multiplicity of the reflection signals of at least one frame of the radar sensor system;

providing a first measurement attribute of at least a first portion of the multiplicity of reflection signals of the at least one frame of the radar sensor system;

transforming the respective spatial coordinates of the multiplicity of reflection signals of the at least one frame into an occupancy grid;

generating an occupancy grid, wherein the multiplicity of reflection signals of the at least one frame are spatially represented in the occupancy grid by transforming the respective spatial coordinates of the multiplicity of reflection signals of the at least one frame in the occupancy grid and assigning the respective first measurement attribute of the multiplicity of reflection signals of the at least one frame to the transformed spatial coordinates of the multiplicity of reflection signals of the at least one frame;

generating an input tensor using the occupancy grid that spatially represents the multiplicity of reflection signals of the at least one frame and the respective assigned first measurement attribute; and detecting the at least one object using the input tensor and a trained neural network, the trained neural network being configured to receive the input tensor as input and to output both an object classification and a location of the object as output.

2. The method according to claim 1, wherein the occupancy grid comprises Cartesian coordinates and/or is arranged around the radar sensor system.

3. The method according to claim 1, further comprising:

providing respective second measurement attributes respectively determined using at least one second portion of the multiplicity of reflection signals of the at least one frame; and generating the input tensor by additionally assigning the respective second measurement attribute of the at least first portion of the multiplicity of reflection signals of the at least one frame to the multiplicity of reflection signals in the occupancy grid.

4. The method according to claim 1, wherein the input tensor is generated by the occupancy grid being designed in a two-dimensional manner and the respective spatial coordinates of the multiplicity of reflection signals of the at least one frame being transformed into the two-dimensional occupancy grid.

5. The method according to claim 1, wherein the input tensor is generated by spatially representing the multiplicity of reflection signals of a multiplicity of frames in the occupancy grid.

6. The method according to claim 3, wherein:
the first measurement attribute of the reflection signal is different from the second measurement attribute of the reflection signal; and/or
the respective measurement attribute comprises a speed, and/or a radar cross-section, and/or an elevation.

7. A method for training a neural network used for detecting at least one object using reflection signals of a radar sensor system, comprising:
providing respective spatial coordinates of a multiplicity of reflection signals of at least one frame of the radar sensor system;
providing respective first measurement attributes of at least a first portion of the multiplicity of reflection signals of the at least one frame of the radar sensor system;
transforming the respective spatial coordinates of the multiplicity of reflection signals of the at least one frame into an occupancy grid;
providing spatial coordinates of the at least one object to be detected by the reflection signals of the radar sensor system;
generating the occupancy grid, wherein the multiplicity of the reflection signals of the at least one frame are spatially represented in the occupancy grid by transforming the respective spatial coordinates of the multiplicity of the reflection signals of the at least one frame into the occupancy grid and assigning the respective first measurement attribute of the multiplicity of the reflection signals of the at least one frame to the transformed spatial coordinates of the multiplicity of the reflection signals of the at least one frame;
generating an input tensor using the occupancy grid that spatially represents the multiplicity of the reflection signals of the at least one frame and the respective assigned first measurement;
forming a multiplicity of input tensors generated in this manner, each having a multiplicity of different reflection signals of at least one frame of the radar sensor system; and
training the neural network using the multiplicity of input tensors and respective assigned provided spatial coordinates of the at least one object to be detected, the neural network being trained to output both an object classification and a location of the object as output based on a respective input tensor received as input.

8. The method according to claim 7, further comprising:
providing respective second measurement attributes determined using at least a second portion of the multiplicity of reflection signals of the at least one frame; and
generating the input tensor by additionally assigning the respective second measurement attribute of the at least first portion of the multiplicity of reflection signals of the at least one frame to the multiplicity of reflection signals in the occupancy grid.

9. The method according to claim 7, wherein the input tensor is generated by designing the occupancy grid in a two-dimensional manner and transforming the respective spatial coordinates of the multiplicity of reflection signals of the at least one frame into the two-dimensional occupancy grid.

10. The method according to claim 7, wherein the input tensor is generated by spatially representing the multiplicity of reflection signals of a multiplicity of frames in the occupancy grid.

11. The method according to claim 1, wherein the neural network comprises a backbone network and a head network.

12. The method according to claim 11, wherein the backbone network comprises a neural convolutional network.

13. The method according to claim 1, wherein, based on at least one detected object, an actuating signal is transmitted to actuate an at least semi-automated vehicle and/or, based on the at least one detected object, an alert signal is transmitted to alert a vehicle occupant.

14. A detection device configured to perform a method according to claim 1.

15. A non-transitory computer-readable storage medium that stores a computer program comprising commands that, when the computer program is executed by a computer, cause the computer to perform the method according to claim 1.

* * * * *